(12) United States Patent
Feola

(10) Patent No.: US 6,325,250 B1
(45) Date of Patent: Dec. 4, 2001

(54) CONTINUOUSLY OPERATIONAL HIGH VOLUME FROZEN CONFECTION DISPENSING MACHINE

(76) Inventor: Anthony V. Feola, P.O. Box 138, Boston, MA (US) 02125-5138

( * ) Notice: Subject to any disclaimer, the term of this patent is extended or adjusted under 35 U.S.C. 154(b) by 0 days.

(21) Appl. No.: 09/378,971

(22) Filed: Aug. 23, 1999

Related U.S. Application Data

(63) Continuation of application No. 08/986,960, filed on Dec. 8, 1997, now Pat. No. 5,957,040, which is a continuation-in-part of application No. 08/864,127, filed on Jun. 4, 1997, now abandoned, which is a continuation of application No. 08/399,901, filed on Mar. 7, 1995, now abandoned, which is a continuation of application No. 07/928,452, filed on Aug. 12, 1992, now Pat. No. 5,400,614.

(51) Int. Cl.[7] .................................................. B67D 5/58
(52) U.S. Cl. .................. 222/190; 222/146.6; 222/185.1; 222/399
(58) Field of Search .................. 222/146.6, 185.1, 222/190, 399

(56) References Cited

U.S. PATENT DOCUMENTS

| | | | |
|---|---|---|---|
| 2,925,347 | 12/1960 | Cummings et al. | 99/180 |
| 3,441,418 | 4/1969 | Nishikiori | 99/86 |
| 3,521,666 | 7/1970 | Scaramucci | 137/454.2 |
| 3,615,675 | 10/1971 | Wisdom et al. | 99/83 |
| 3,677,443 | 7/1972 | Smadar et al. | 222/94 |
| 3,898,859 | 8/1975 | Duke | 62/135 |
| 4,020,188 | 4/1977 | Forkner | 426/95 |
| 4,109,775 | 8/1978 | Hayashi | 194/217 |
| 4,171,380 | 10/1979 | Forkner | 426/95 |
| 4,201,558 | 5/1980 | Schwitters et al. | 62/70 |
| 4,203,461 | 5/1980 | Schwitters | 137/343 |
| 4,275,567 | 6/1981 | Schwitters | 62/63 |
| 4,364,491 | 12/1982 | Adamson | 221/267 |
| 4,364,666 | 12/1982 | Keyes | 366/142 |
| 4,390,760 | 6/1983 | Schwitters | 200/61.04 |
| 4,393,659 | 7/1983 | Keyes et al. | 62/66 |
| 4,427,703 | 1/1984 | Schafer et al. | 426/101 |
| 4,544,085 | 10/1985 | Frazer | 222/146.4 |
| 4,569,848 | 2/1986 | Giorgetti et al. | 426/94 |
| 4,580,905 | 4/1986 | Schwitters | 366/149 |
| 4,645,093 | 2/1987 | Jones | 221/93 |
| 4,707,997 | 11/1987 | Bigler et al. | 62/341 |
| 4,732,013 | 3/1988 | Beck | 62/343 |
| 4,741,908 | 5/1988 | Brooks | 426/95 |
| 4,752,488 | 6/1988 | Hayashi et al. | 426/281 |
| 4,758,143 | 7/1988 | Lopes | 425/91 |
| 4,788,071 | 11/1988 | Hayashi et al. | 426/281 |
| 4,793,279 | 12/1988 | Grenier | 113/16 |
| 4,822,627 | 4/1989 | Clegg et al. | 426/101 |
| 4,878,760 | 11/1989 | Newton et al. | 366/149 |
| 4,910,030 | 3/1990 | Trojahn | 426/94 |
| 4,958,747 * | 9/1990 | Sheets | 222/146.6 |
| 5,025,840 | 6/1991 | Tacke | 141/253 |
| 5,044,517 | 9/1991 | U Park | 221/11 |
| 5,464,120 * | 11/1995 | Alpers et al. | 222/146.6 |
| 5,620,115 * | 4/1997 | McGill | 222/146.6 |
| 5,931,343 * | 8/1999 | Topar et al. | 222/190 |

\* cited by examiner

*Primary Examiner*—Joseph A. Kaufman
(74) *Attorney, Agent, or Firm*—Gunster, Yoakley & Stewart, P.A.

(57) ABSTRACT

A frozen confection dispensing machine for dispensing a predetermined volume of a frozen confection. In one embodiment, the machine includes a user interface and programmable control circuit to allow an operator to select the volume of extruded frozen confection for a particular product. In another embodiment, the machine includes a readily accessible hollow member to supply the machine with additional mix without interrupting extrusion of the frozen confection. In another embodiment, a plurality of frozen confection dispensing machines are located adjacent a conveyor belt for filling a pastry product with a selected volume of frozen confection.

12 Claims, 12 Drawing Sheets

CONTINUOUSLY OPERATIONAL HIGH VOLUME FROZEN CONFECTION DISPENSING MACHINE

CROSS-REFERENCE TO RELATED APPLICATIONS

This application is a continuation of application Ser. No. 08/986,960, filed Dec. 8, 1997, now U.S. Pat. No. 5,957,040 which is a continuation-in-part of application Ser. No. 08/864,127, filed Jun. 4, 1997, now abandoned which is a continuation of application Ser. No. 08/399,901, filed Mar. 7, 1995, now abandoned which is a continuation of Ser. No. 07/928,452, filed on Aug. 12, 1992, now U.S. Pat. No. 5,400,614, all of which are incorporated herein by reference.

STATEMENTS REGARDING FEDERALLY SPONSORED RESEARCH

Not applicable.

BACKGROUND OF THE INVENTION

While there are many makes and designs of machines for continuous freezing of soft desserts, most of them operate on a similar principle. A mixture of milk products, sugar, gelatin or similar thickener, flavors, coloring, nuts, fruits, syrups and sometimes eggs for both flavor and whipping ability is fed into a metal cylinder or mixing chamber around which a compressed gas is expanded, making the metal surface very cold. Ice crystals freeze to the surface and while yet quite small, they are scraped off by sharp blades revolving around the interior of the cylinder. Part of the scraping assembly is a beating arrangement that whips in air, thus increasing the volume of the mixture. The assembly moves the frozen dessert to the discharge mechanism as well.

Air incorporated into the mix is known as "overrun." While a regular ice cream may have 100% overrun, which means 50% of air by volume, a soft ice cream usually has 30–80% overrun, which means 20–40% of air by volume.

A wide variety of commercial extruders for soft frozen desserts exist, most of which are designed for use at the retail sales level to dispense soft frozen desserts, including frozen yogurt, into cones and dishes. Such dispensers can be found in U.S. Pat. Nos. 4,412,428; 4,707,997; 4,796,784; and 4,544,085, incorporated herein by reference and UK Patent application GB 2,234,556. The amount of dessert dispensed is generally dependent upon the length of time and degree of movement a lever or delivery tap is pushed. Such taps can be found in U.S. Pat. Nos. 3,868,050, 4,711,376 and EP 285,709 A1.

Especially for commercial production, but also desirable at the retail level, is the volumetric extrusion of food material. One approach to this is disclosed in U.S. Pat. No. 4,671,429. Volumetric injection of extruded food material is disclosed in U.S. Pat. Nos. 4,752,488 and 4,788,071, incorporated herein by reference, both issued to Torshiko Hayashi. In U.S. Pat. No. 4,752,488, a plunger creates a vacuum sucking the material from a hopper into a discharge chamber using a 3-way valve, and then dispenses the material through a reciprocating injection nozzle. The length of the filling nozzle can be adjusted. U.S. Pat. No. 4,788,071 discloses a method for quantitatively extruding food materials having large chunks, by moving a piston through a cylindrical space in a hopper.

Pistons are used to aid in the extrusion of frozen desserts in a variety of ways. U.S. Pat. No. 4,580,905 discloses a piston which combines mixing and dispensing functions. UK Patent Application GB 2,172,541 discloses a plunger coordinated with an iris for forming geometrically shaped ice cream pieces.

A cooling tunnel consists of an insulated passage placed around the conveyor to let the product travel through it in a continuous flow. Cold gas is supplied to this passage to cool the product. To achieve maximum heat transfer from the gas to the product, a counterflow principle is used whereby air is introduced at the product exit of the tunnel and withdrawn at the product entrance of the tunnel so that the direction of the air flow is opposite to the direction of the food flow.

Conventional confection dispensing machines generally have one or more mix receptacles located in a bottom portion of the machine. Mix placed in the receptacle is pumped to a mixing chamber located behind the tap levers. The mixing chamber agitates and chills the mix into an extrudable frozen confection. Generally, the machine does not extrude the frozen confection until a desired viscosity and/or temperature has been achieved.

When the supply of mix is exhausted, additional frozen confection mix is supplied to the machine by an operator. After adding the mix, the operator waits for a period of time until the mixture has been beaten and cooled to an acceptable consistency and/or temperature. Upon reaching the proper characteristics, the frozen confection is dispensed from the machine as soft serve, or the like. Thus, after the supply of mix is exhausted, significant time elapses during which the operator obtains additional mix, accesses the mix receptacle, pours in the mix, and waits for the mix to obtain the desired consistency and/or temperature. This time does not include any period of time that the operator has not yet discovered that the supply of mix has been depleted.

In addition to machine down time, there are further drawbacks to adding additional mix to conventional frozen confection machines. The mix receptacle is typically located behind a door in a lower portion of the frozen confection dispensing machine. To add mix to the machine, the operator opens the door in the front of the dispensing machine and pours the frozen confection mix into the mix receptacle. Opening of the door results in temperature fluctuations in the interior of the machine as outside air enters. Such temperature fluctuations encourage the growth of unhealthy bacteria in or about the machine causing batches of mix to become contaminated and therefore unusable.

The open door also provides a passageway for undesirable air borne foreign objects or materials to enter the machine. Such objects and materials can be dispensed from the machine to an unsuspecting end user resulting in possible serious medical consequences.

Where one or more machines are utilized in an assembly line environment, the disadvantages described above can be magnified so that refilling the frozen confection dispensing machines becomes a significant cost of production. For a production line having several machines located adjacent to a conveyor belt, each machine must be periodically refilled with mix. As described above, for each machine that runs out of product, that machine must be taken off-line and refilled. More particularly, after an operator first notices that a machine is no longer dispensing product, the operator moves the machine away from the conveyor belt to open the front door. After the door is opened, the operator pours additional mix into the receptacle and closes the door. It will be appreciated that since the door is located in the bottom front of the machine, the task of continually refilling the machines can become an especially burdensome task. Also, repeated opening of the door allows dust and dirt to enter the machine and it puts a greater demand on the cooling system. After refilling the machine, the operator returns the machine to face the conveyor belt. The mix is then agitated and chilled in the mixing chamber for a period of time to allow the mix to reach a desired consistency, after which extrusion can commence.

Since each machine contributes to the assembly line, production is reduced or stopped for the time needed to refill each empty machine. Production line down time can be compounded if more than one machine must be refilled at any one time. Machine down time incurs other costs as well. For example, the operator is compensated regardless of production efficiency, non-conforming product is wasted, and product demand is unmet.

A frozen confection dispensing machine is desired that can extrude a predetermined amount of frozen confection while being refilled and is adaptable for assembly line operation.

SUMMARY OF THE INVENTION

The present invention relates to machines for extruding a material, and more particularly to a machine providing volumetric extrusion of a frozen confection. Although the invention is described primarily in conjunction with extruding a frozen confection, it is understood that the invention is applicable to a variety of other applications and extrudable materials.

In one embodiment, the apparatus comprises a linear actuator comprised of a cylinder and piston, operated by two electrically controlled solenoid air valves and associated compressed air lines. The solenoid is actuated by a relay from a plate or foot pedal. The rod of the linear actuator is connected by a partially rotatable link to a dispenser tap lever of the soft dessert server. A time delay relay controls the period of time between strokes of the piston. When the tap lever is depressed, frozen dessert is extruded from a discharge port. The discharge port is adapted to accept a variety of nozzles, for filling pastries.

In a further embodiment, a frozen confection dispensing machine includes a control circuit for controlling the extrusion of a frozen confection. The control circuit is programmable via a user interface to allow an operator to control certain machine components. For example, the operator can vary the frozen confection extrusion time to discharge a predetermined amount of frozen confection desired for a particular product. The control circuit also controls an extrusion cycle time so that the machine extrudes frozen confection at a limited rate. By controlling the extrusion cycle time, the machine extrudes frozen confection at a desired viscosity, i.e., temperature, to ensure consistent extrusion volumes.

In another embodiment, a frozen confection machine can extrude frozen confection while being refilled with mix. The machine includes a hollow member extending from a mix receptacle housed in the machine to a point external to the machine. Additional mix is supplied to the mix receptacle via the hollow member. Since mix can be added as the machine extrudes frozen confection, the machine is continuously operational so that no down time is required to add mix to the machine.

In a further embodiment, a plurality of machines providing volumetric extrusion and continuous operation are located adjacent to a conveyor belt. In one embodiment, pastry products travel on the conveyor belt proximate the machines and the pastry is filled with a predetermined amount of the frozen confection.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
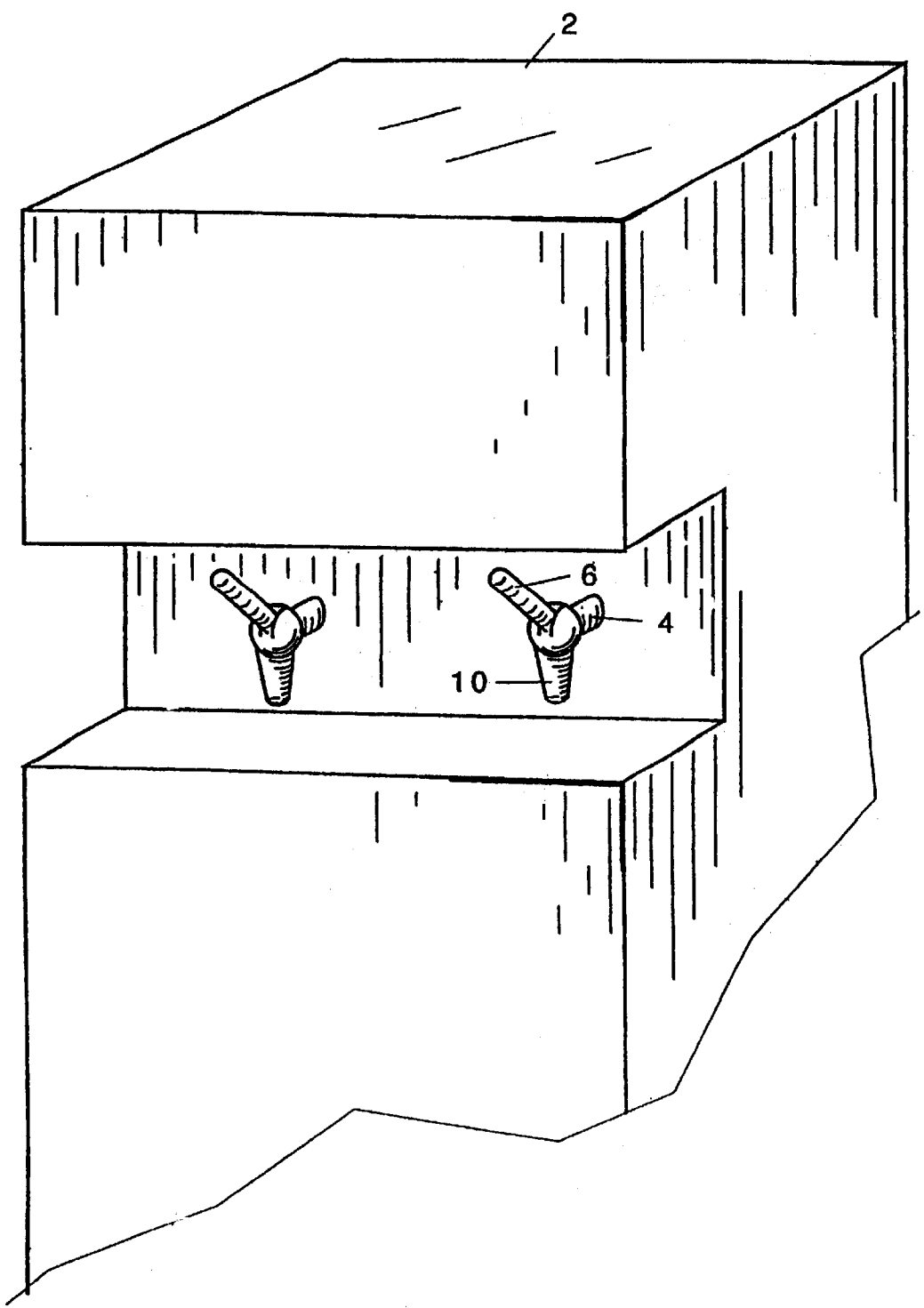
FIG. 1 is a perspective view of a manually operated soft serve dessert machine.
Figure 2:
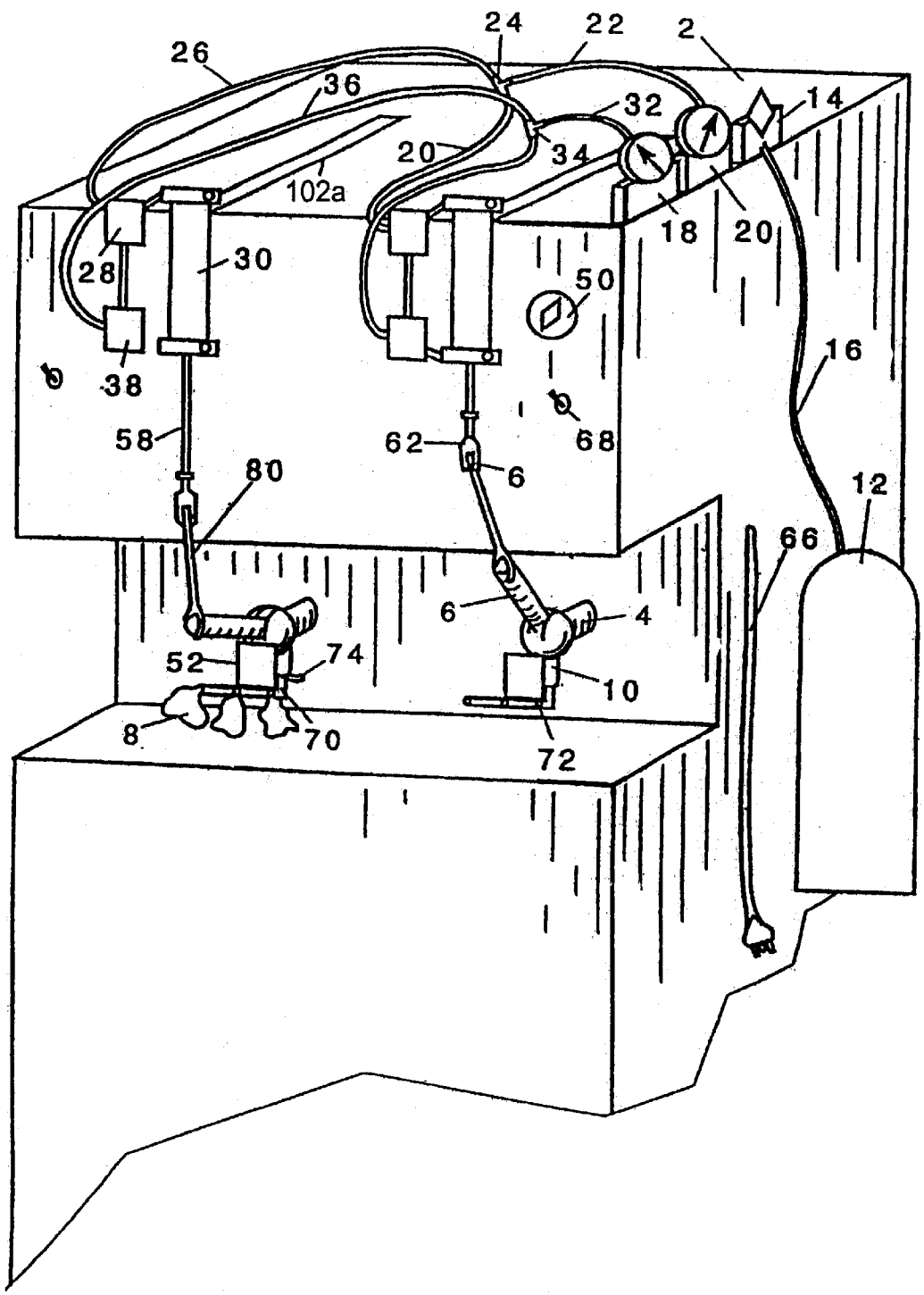
FIG. 2 is a perspective view of a soft serve dessert machine adapted for volumetric filling of eclairs.

FIG. 1 represents a commercially available soft serve dessert machine. A cabinet 2 encloses a compressor and mixer for frozen confections or soft serve desserts such as ice cream or frozen yoghurt. The dessert exits the machine through passage 4 to the tap. When dispenser tap lever 6 is depressed, dessert 8 is dispensed out port 10.

A Taylor soft serve ice cream machines was used to produce ice cream and store it. The formerly manual discharge, was converted to automatic dispensing and filling of pastry from two dispensers. The conversion is readily adaptable to any number of ports.

Compressed air is supplied to an air manifold 14 by an air hose 16 where it is regulated to operating pressure via pressure gage regulators 18 and 20. Two regulators are preferable since pressure for a downward stroke is less than pressure for an upward stroke due to gravity.

Regulated air from gage 20 passes through a hose 22 and is divided into two streams by a T 24. It then travels through hose 26 to the inlet port of a first electrically operated solenoid air valve 28 connected to the upper end of a cylinder 30 supported by a support 102a.

Regulated air from gage 18 passes through a hose 32 and is divided into two streams by a T 34. It then travels through hose 36 to the inlet port of a second electrically operated solenoid air valve 38 connected to the lower end of a cylinder 30.

In the "off" position, that is with no dessert 8 flowing, first air intake 40 is closed and first air discharge 42 is open; second air intake 44 is open and second air discharge 46 is closed. Air pressure from gauge 18 moves internal piston 48 upward. Upward movement of the piston 48 is transferred along the linkage, urging tap connection link 80 and engaged tap lever 6 through snap on linkage fork 56 upward.

In the "on" position first air intake 40 is open and first air discharge 42 is closed; second air intake 44 is closed and second air discharge 46 is open. Air pressure from gauge 18 move piston 48 downward. Downward movement of the piston 48 is transferred along the linkage, urging tap connection link 80 and engaged tap lever 6 downward.

A setting is made on a timer relay 50 corresponding to the time needed to fill a given pastry. Individual pastries typically use from 25–170 gm of filling. This delay time controls the volume of flow. However, the flow may be further regulated by installation of an iris (adjustable aperture) in the exit port of the machine 10. When an activator plate 52 is pressed, a circuit is completed initiating the cycle and the solenoid valves move to the "on" position. The plate 52 may be positioned in proximity to the discharge port 10 to be activated by pressure from a pastry shell 54 or positioned by cable in a foot pedal for remote operation. The circuit may also be completed by a coin box to allow for a soft serve vending machine. At the end of the time cycle, after volumetric fill is complete, the valves quickly move the piston 48 to the "off" position.

Figure 4:
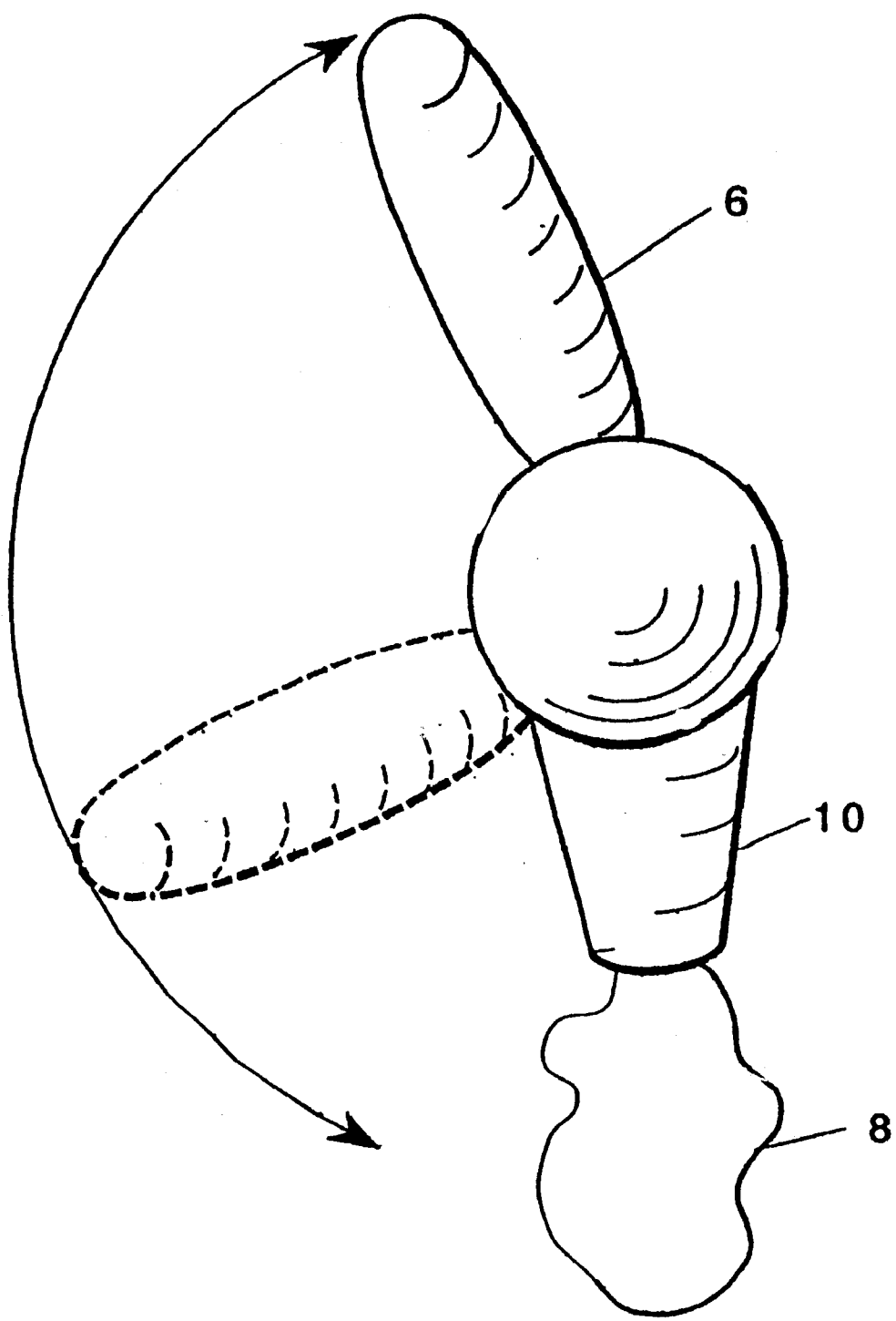
FIG. 4 is a view of a dispenser tap showing non-linear displacement.

FIG. 4 shows the path traversed by a tap lever. If the linear motion of an actuator such as the cylinder and piston is transferred directly to the outer terminus of the tap lever 6 traveling in an arc, the apparatus would bind. To minimize the amount of horizontal motion that must be accommodated, alignment of a piston over a path that divides play in equally in two directions is desirable. Further, linkage from the piston 48 to the tap lever 6 should allow for limited rotation about an axis. If at the beginning, at the end, and half way through the piston motion, the greatest rotation is encountered, then at a quarter and at three quarters of the way through the piston motion, linkage should be nearly in line with the piston.

Figure 3:
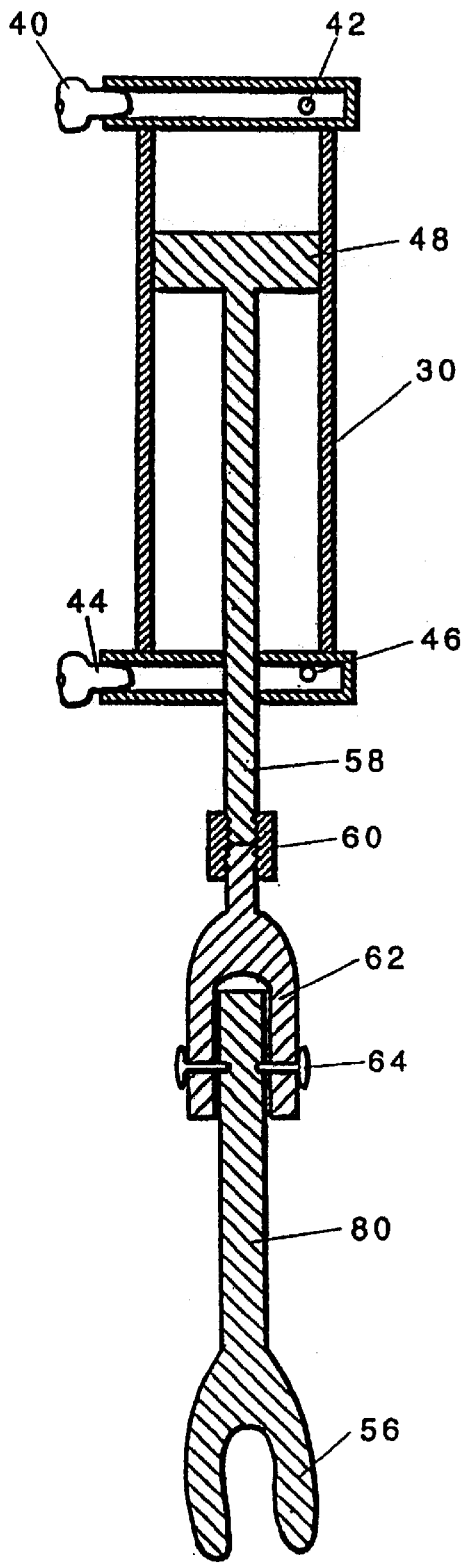
FIG. 3 is a cross sectional view of the linear actuator and rotatable link.

FIG. 3 shows one such linkage system. Connected to the extension rod 58 of internal piston 48 by a connector such as a bolt 60, is a yoke 62. Held in yoke 62 by rotational pins 64 is connecting link 80. The amount of horizontal motion allowed by pivoting about pins 64 is controlled by the depth of the space created between the base of the yoke 62 and the top surface of the connecting link 80; and by the diameter of the connecting link 80. As the link 80 rocks an outer portion approaches the base of the yoke 62 and upon reaching it cannot rotate further.

Figure 8:
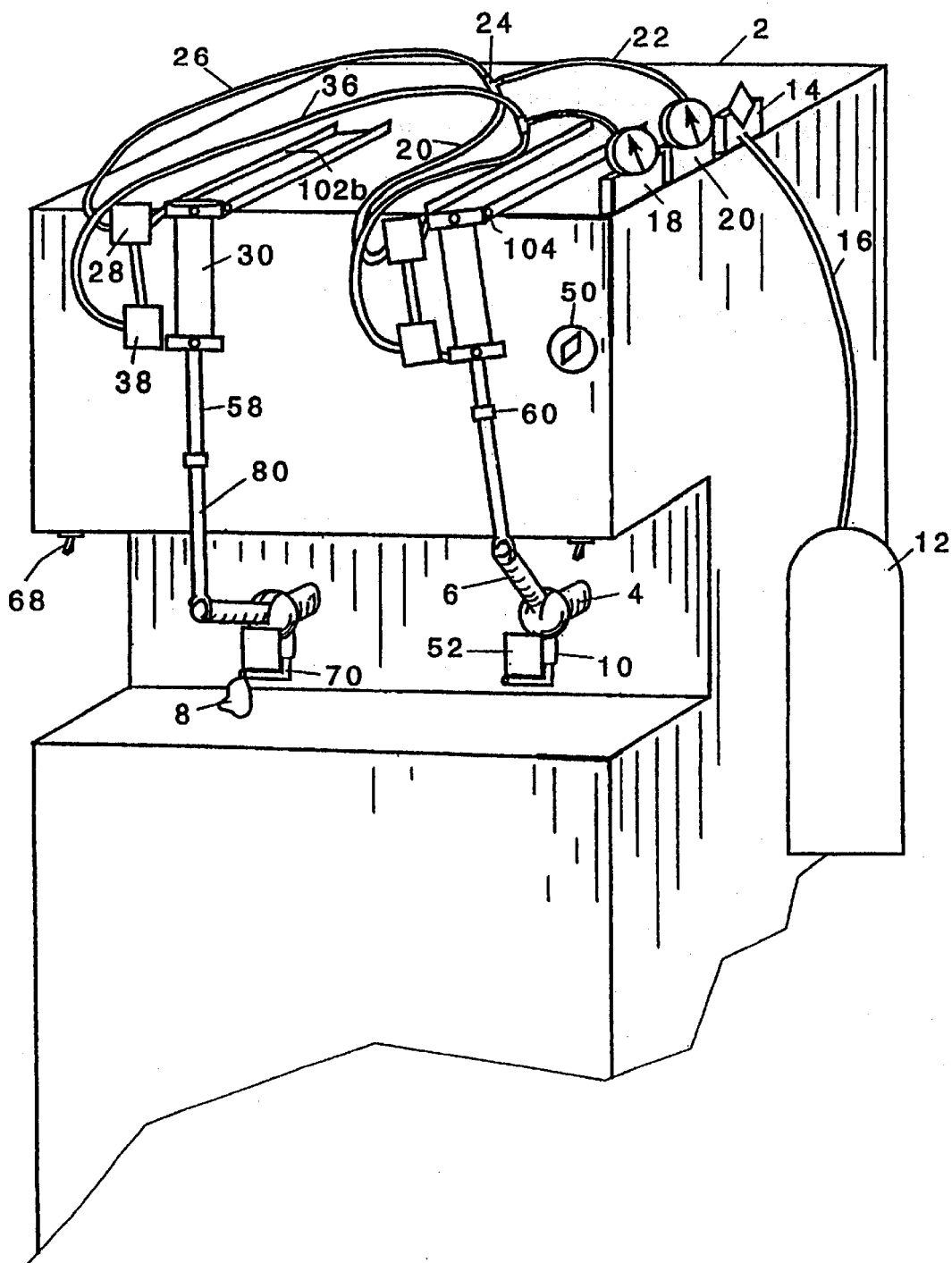
FIG. 8 is a view of an alternate adaptation of a soft serve dessert machine.

FIG. 8 shows an alternative adaptation system, in which the cylinder is pivotally mounted to a support 102b by pins 104.

Electrical power to the unit can be supplied by a separate cord 66, and individual units be taken off line by means of toggle switches 68.

Figure 5:
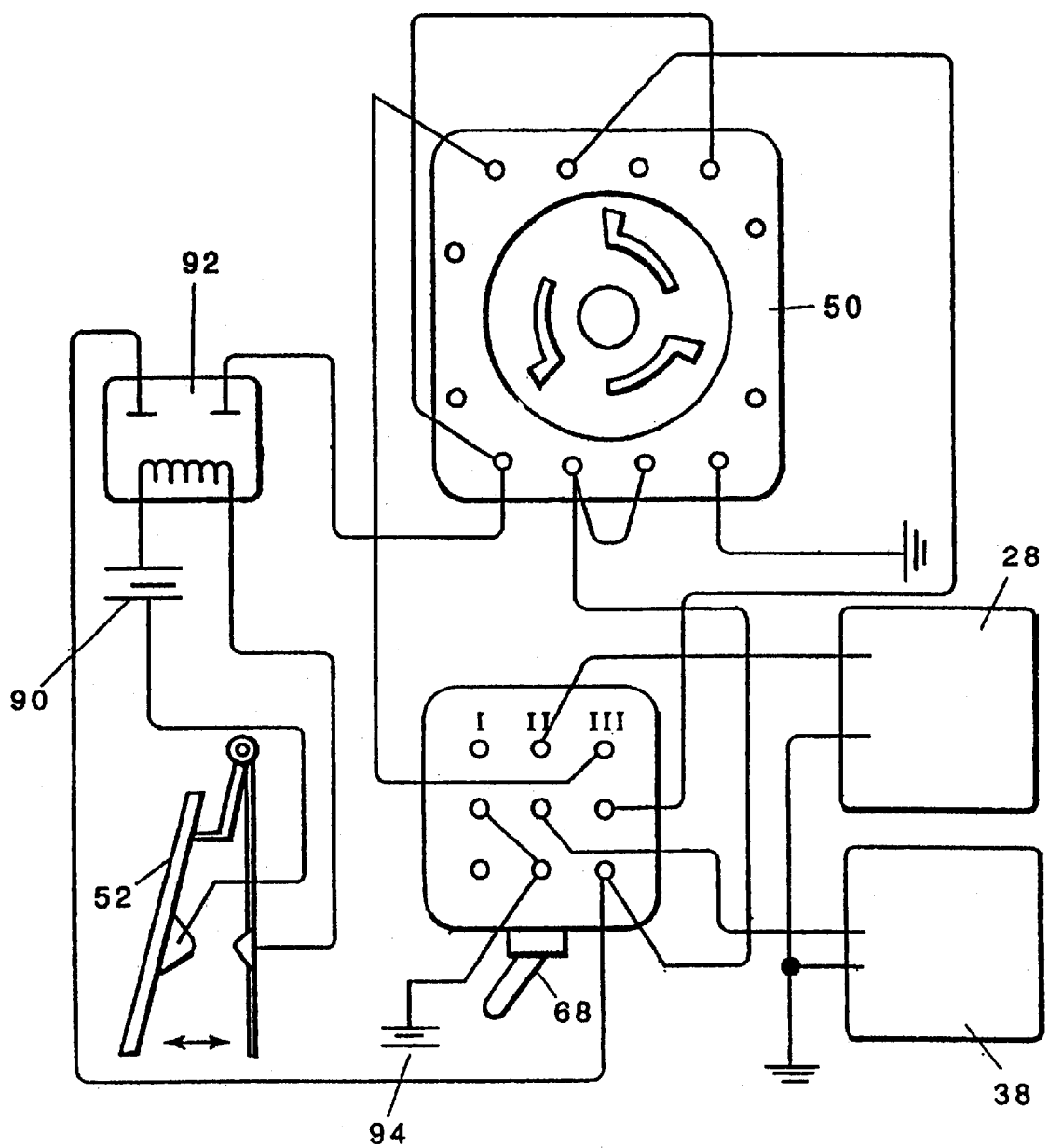
FIG. 5 is a view of the plate lever with a schematic electric circuit.

FIG. 5 shows an schematic for controlling the solenoid. When actuating plate 52 is depressed a circuit passes through anticipator 92. Voltage source 90 can be derived from the voltage of the frozen desert compressor if stepped down by means of a transformer. When the circuit is detected by the anticipator 92, electrical current flows to toggle switch 68. If the toggle 68 is in one position, column I is connected to column II such that the upper solenoid valve 28 has no connection, the lower solenoid valve 38 is connected to power source 94 (which may also be connected to the compressor) and power source 94 is not connected. This is the off-line position. If the toggle switch is in the alternate position, the solenoids are individually connected to the timer relay, and a pathway for current from the anticipator to the timer is completed.

The equipment is readily adaptable to coin operation. Rather than completing the anticipation circuit by depressing a plate 52, the circuit could be completed by a coin. Such a coin operated circuit is shown in U. S. Pat. No. 4,109,775, incorporated herein by reference. A dish could be placed in position for receiving the soft serve dessert in a manner similar to the way beverage cups are discharged in beverage vending machines. Such a cup dispenser is disclosed in U.S. Pat. No. 5,044,517 incorporated herein by reference.

The anticipation circuit could also be designed to be completed by an "electric eye". This could be used in vending or in automated production. In production, a pastry would come in line with the light beam signaling discharge of the soft serve dessert, allowing for automation of a production line.

A variety of discharge nozzles give the machine greater flexibility. Left open a regular port 10 can be used to fill cones or dishes. The addition of a short L shaped nozzle facilitates the injection of cream puffs. A longer L shape 70 having additional slots or apertures 72 on the spout is used for filling eclairs. Attachment of a hose would allow for filling cakes at a remote location. To accommodate the ports, a quickly changeable nozzle is used.

Figure 6B:
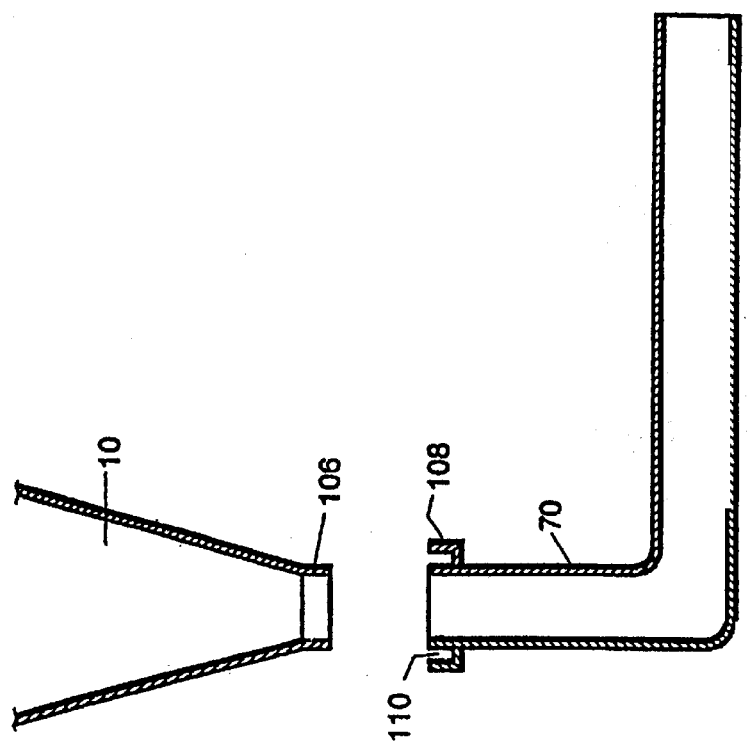
FIG. 6b is a cross sectional view of an alternate embodiment of an interchangeable nozzle for a cream puff.
Figure 6A:
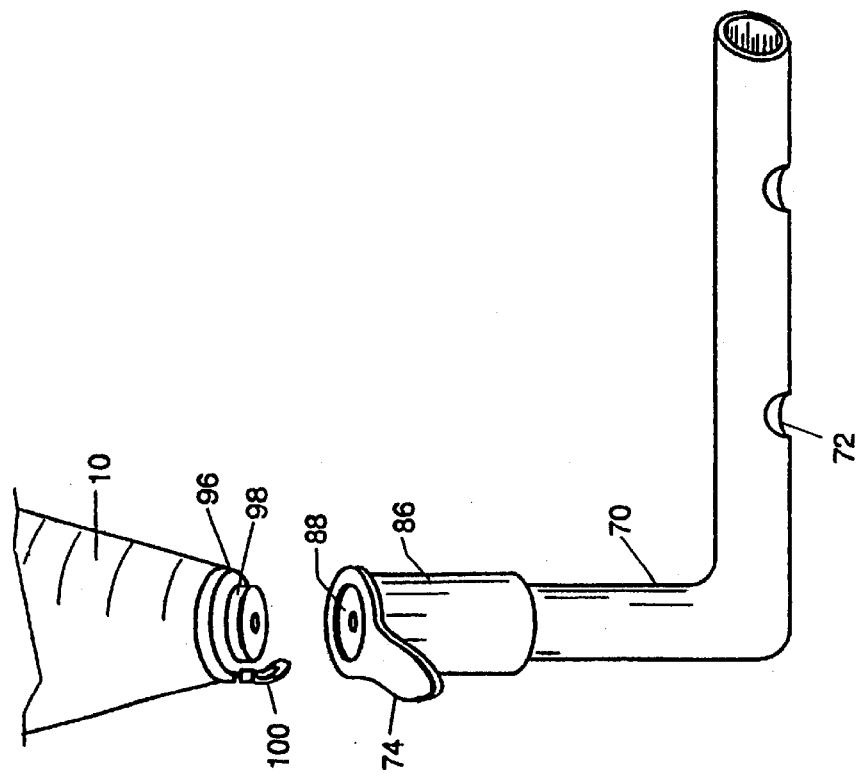
FIG. 6a is a perspective view of an interchangeable nozzle, adapted for an eclair
Figure 7:
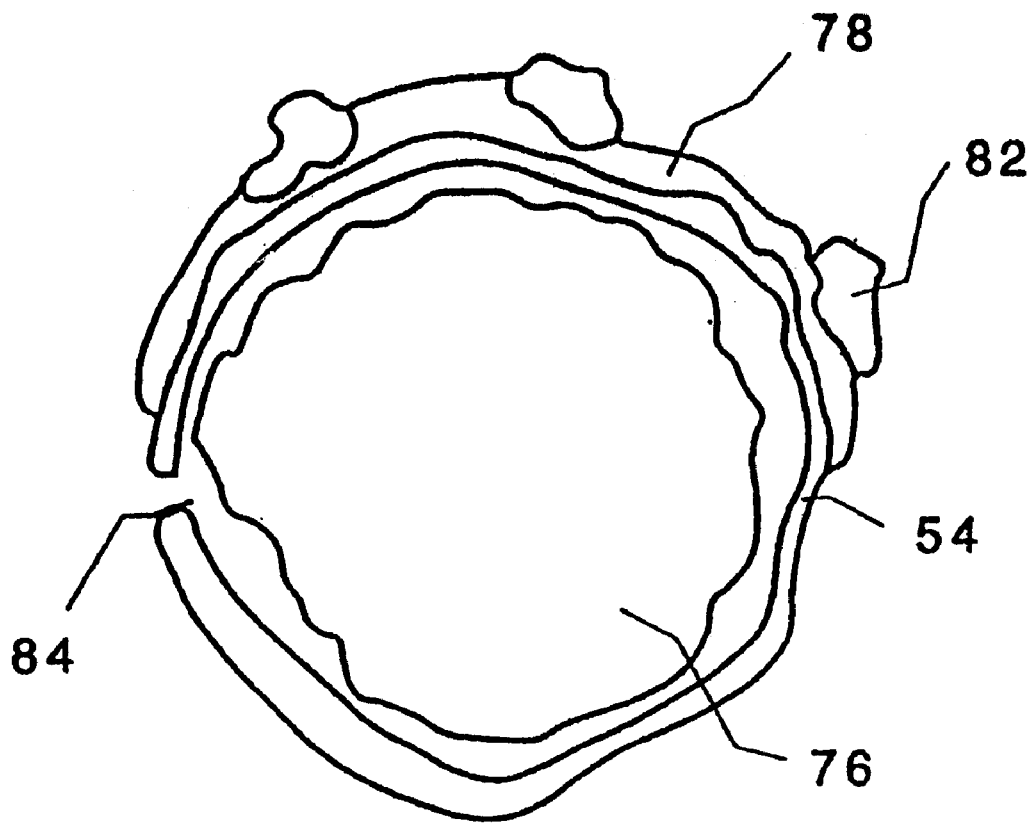
FIG. 7 is a view of a frozen dessert.

One nozzle is shown in FIG. 6a. An L shaped nozzle is equipped with aplastic hub 86 having a recess 88 and a wing 74. The port 10 is equipped with a matched fitting 96 having a snug fitting projection 98 and a grooved edge extension 100. At the top of the nozzle 70 is located a plastic hub having a wing 74. At the bottom of the regular port 10 is located as a receptacle for the hub having a slot for locking the wing 74 in a preset position.

A second nozzle is shown in FIG. 6b. Port extension 106 fits snugly into a recess 110 formed between the upper end of nozzle 70 and a plastic fitting 108.

While a fluid piston is disclosed as a linear actuator, other linear actuators could be attached to the yoke. Further, non-linear motions, such as those created by a cam could be harnessed for moving a tap lever.

While the timer described is an electrical relay, mechanical timers could also be used.

While the port disclosed is open and shut via a tap lever, making it possible to adapt existing machines, other port controls such as irises or a sliding plate are possible.

Figure 9:
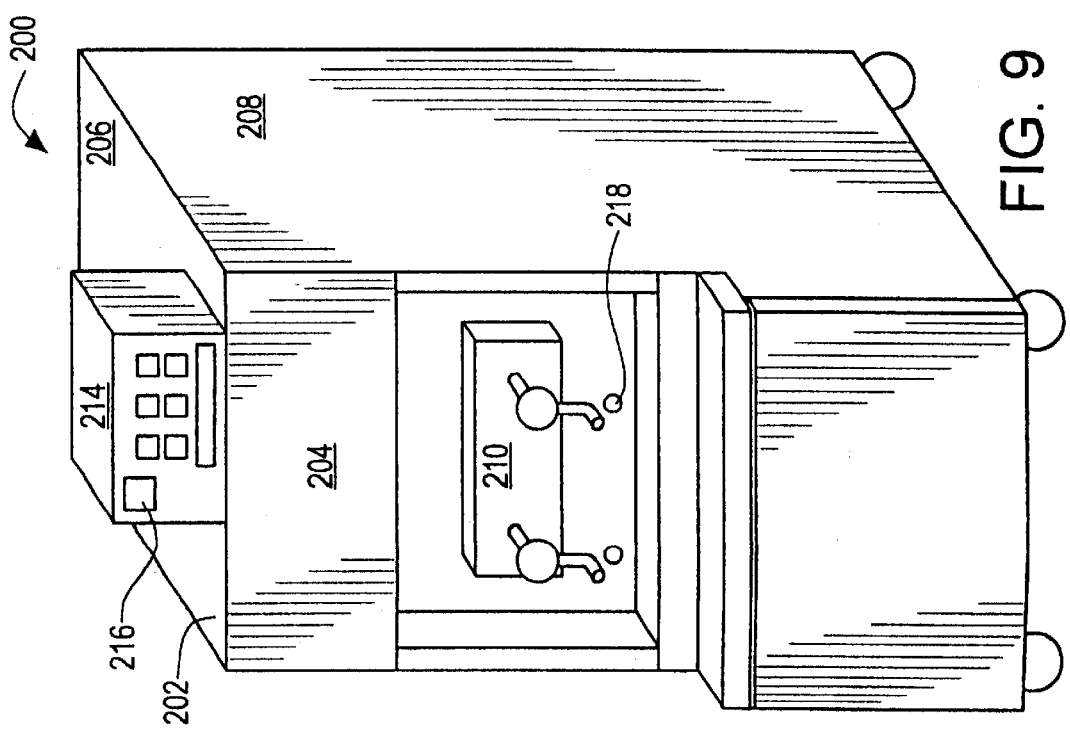
FIG. 9 is a perspective view of another embodiment of a frozen confection dispensing machine in accordance with the present invention.

FIG. 9 shows another embodiment of a frozen confection dispensing machine 200 providing controllable extrusion of a frozen confection. The machine 200 includes a housing 202 having front 204, top 206, and side portions 208. An outlet port or extrusion assembly 210 is located at the front 204 of the machine for extruding a frozen confection. The machine 200 has a control circuit 212 (FIG. 10) that is programmable via a user interface unit 214 disposed on the machine. The user interface 214 allows an operator to control extrusion of the frozen confection. The operator can select the volume of frozen confection to be extruded by the machine in accordance with an amount required for a given product.

The user interface unit 214 can include a variety of devices that allow an operator to input parameters for controlling operation of the machine. Exemplary devices include keypads, dials, and touch screens. One of ordinary skill in the art will appreciate that other devices may be used as well. In one embodiment, the user interface 214 includes a keypad and a readout to indicate one or more selected parameters. The user interface 214 can provide additional information such as temperature of the frozen confection via a digital readout 216.

The user interface unit 214 can be located on or in the machine or at a remote location. The user interface 214 can be directly connected to the control circuit 212 or can transmit signals to be received by the control circuit, i.e. "wireless". In one embodiment, the user interface unit 214 is located on a top portion 206 of the machine and the control circuit 212 is housed within the user interface unit.

The control circuit 212 is coupled to the user interface 214 to receive and store the various control parameters input by an operator. The control circuit 212 can implement the desired control using discrete components, timer integrated circuits, processors and programmable devices.

Figure 10:
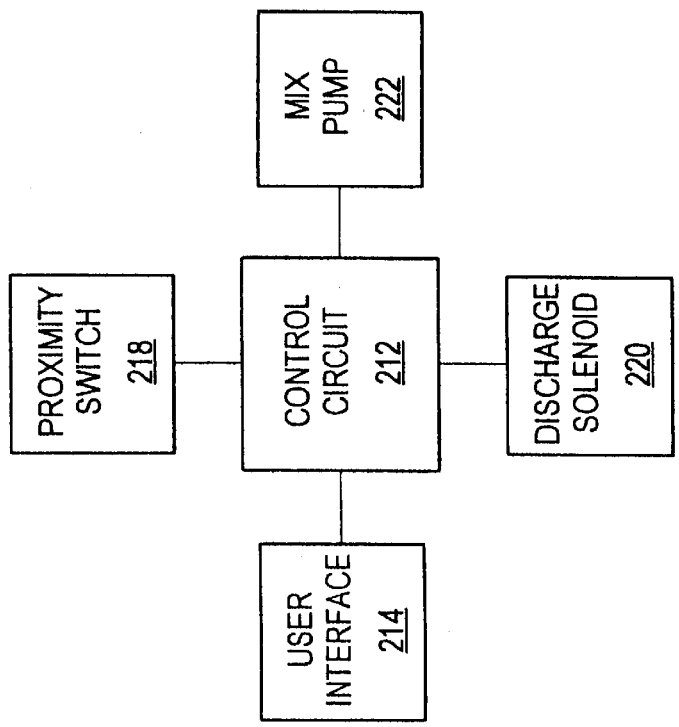
FIG. 10 is a block diagram of a control circuit forming a portion of the frozen confection dispensing machine of FIG. 9.

FIG. 10 shows an exemplary block diagram of the control circuit 212 providing control over various machine components. The user interface 214 is coupled to the control circuit 212 to provide a means for an operator to input parameters for controlling operation of the machine. The control circuit 212 is coupled to a proximity switch 218 for initiating an extrusion cycle, as described below. During an extrusion cycle, a discharge solenoid 220 is activated by the control circuit 212 for a predetermined amount of time to extrude a preselected volume of the frozen confection. As frozen confection is extruded, a mix pump 222 pumps mix from a mix receptacle (FIG. 11) to the mixing chamber to replace extruded frozen confection.

Figure 10A:
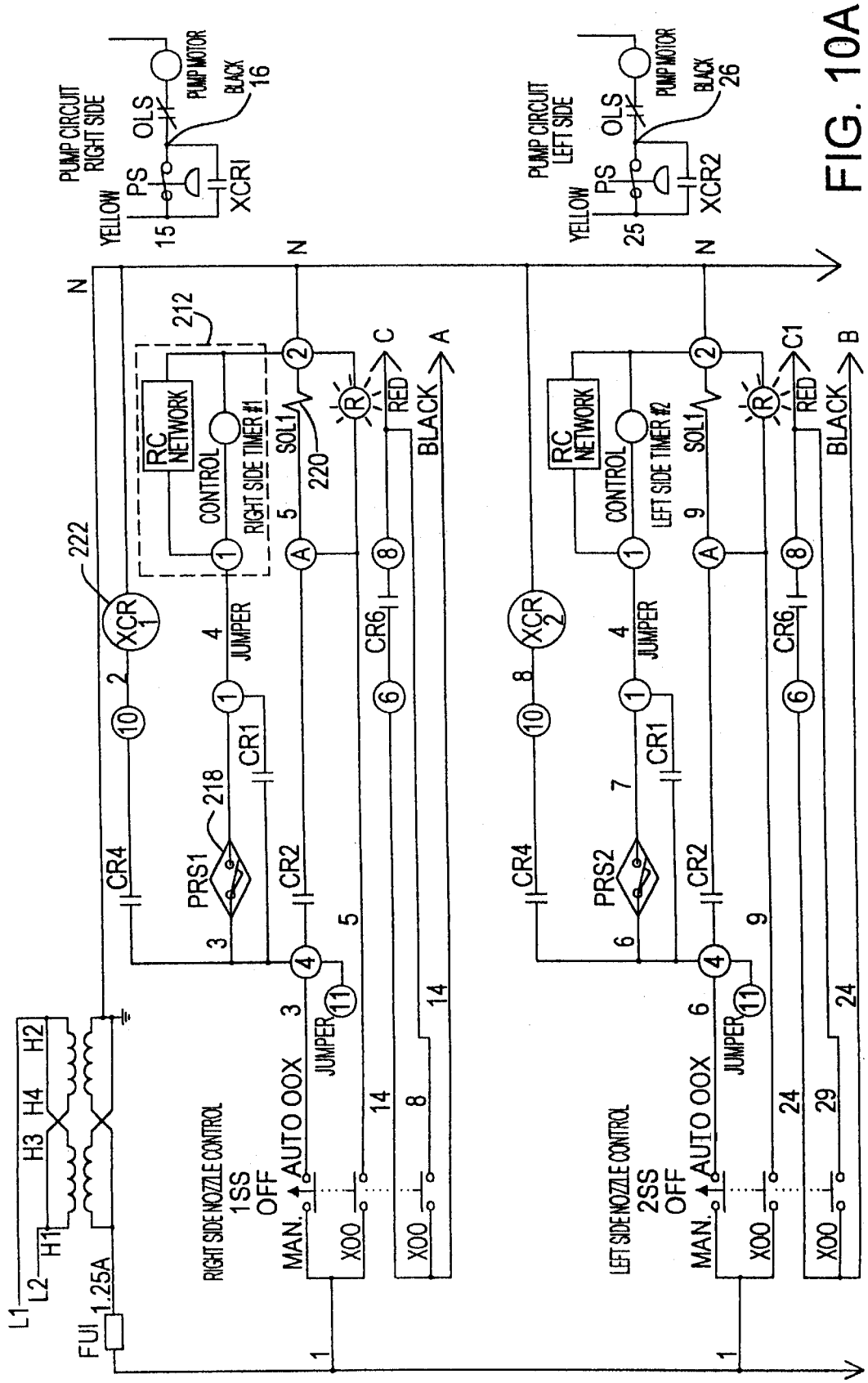
FIG. 10A is an exemplary schematic diagram of the control circuit of FIG. 10.

FIG. 10A is a schematic diagram of an exemplary control circuit 212 implementation having independent right and left side control circuits for controlling the left and right frozen confection discharge ports, as described above. The control circuit 212 controls the discharge solenoid 220 and mix pump 222 upon activation of the proximity switch 218.

In operation, the proximity switch 218 sends a signal to the control circuit 212 that frozen confection should be extruded from the machine. The proximity switch 218 can be activated manually by an operator or automatically in an assembly line environment. In one embodiment, the proximity switch 218 is activated as an operator actuates the tap assembly 210 to create contact with the switch. The control circuit 212 detects activation of the proximity switch 218 and causes the discharge solenoid 220 to be energized for a predetermined amount of time. This time corresponds to a selected volume of frozen confection to be extruded from the machine. During and/or after activation of the discharge solenoid 220, the control circuit 212 energizes the mix pump 222 to cause mix to flow from the mix receptacle to the mixing chamber.

The control circuit 212 has a preselected cycle time initiated by activation of the proximity switch. That is, after switch activation a predetermined time elapses before the machine will respond to a further activation of the proximity switch. This cycle time, i.e., four seconds, allows the machine to maintain a desired consistency for the extruded frozen confection. The frozen confection should be extruded at a constant temperature, about 25 degrees Fahrenheit, to ensure that the same volume of product is extruded for each extrusion cycle. As the machine has a constant extrusion time, variations in the frozen confection consistency (i.e., temperature) result in irregular extrusion volumes.

For an exemplary frozen confection volumetric discharge of about two ounces, the discharge solenoid 220 is activated for about 0.85 seconds. During and/or after the frozen confection is discharged, the mix pump 222 turns on for about 1.50 seconds to replace the extruded material with mix from the mix receptacle. The control circuit 212 then provides a time delay of about 1.00 second to allow agitation of the material in the mixing chamber so that the extruded material maintains a predetermined consistency.

Figure 11:
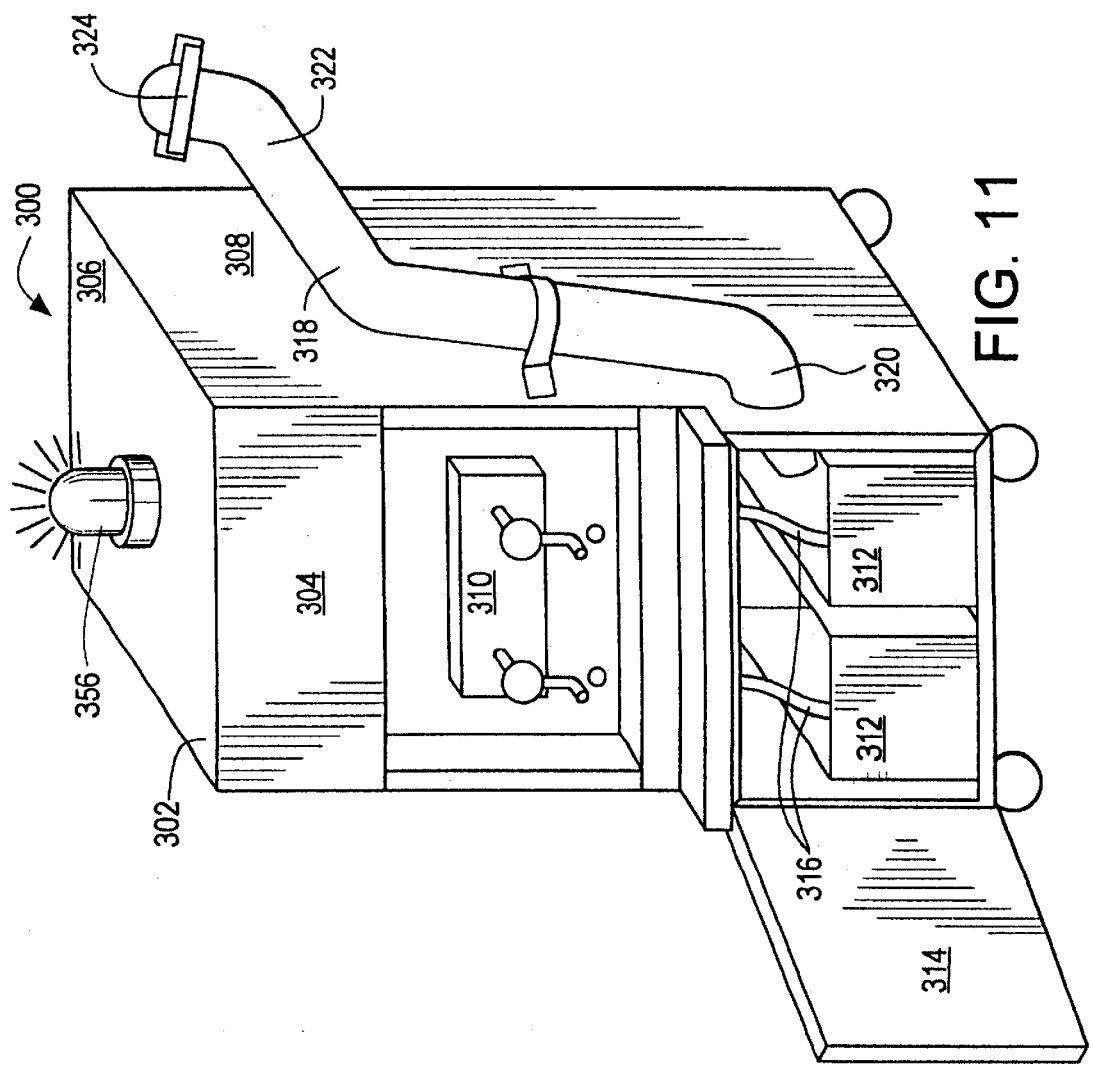
FIG. 11 is a perspective view of a further embodiment of a frozen confection dispensing machine in accordance with the present invention.

FIG. 11 is a further embodiment of a frozen confection dispensing machine 300 in accordance with the present invention. The machine 300 includes a rectangular housing 302 having front 304, top 306, and side 308 portions. An outlet opening or extrusion assembly 310 is located at the front 304 of the machine for extruding a frozen confection. One or more mix receptacles 312 for holding a supply of mix are located in a lower front portion 304 of the machine behind an outwardly opening door 314. The door 314 provides direct access to the mix receptacles 312. Hoses 316 provide passageways for mix to flow from the mix receptacle to the mixing chamber located behind the tap assembly 310. An inlet opening for receiving additional mix provides a passageway to the interior of the machine. In one embodiment, the inlet opening includes a tube or hollow member 318 disposed alongside the machine for providing fluid access to the mix receptacles 312.

The hollow member 318 can be formed in a variety of configurations. The hollow member 318 can be rigid with a predefined shape, or it can be flexible. The hollow member can be selectably positionable by an operator. That is, the tube 318 retains a first position until moved to a further position. The hollow member can exit the housing in any location that does not interfere with operation of the machine and is accessible to an operator. The machine can include a plurality of hollow members at various locations and the hollow members can include multiple passageways to provide access to multiple mix receptacles.

In a preferred embodiment, the hollow member 318 is rigid and located on a side portion 308 of the machine. An outlet end 320 of the hollow member extends from a location proximate the mix receptacle and an input end 322 is located proximate an upper portion of the machine and is sealed with a removable cap 324. A screen or filter (not shown) can be secured across the input end 322 of the hollow member to prevent unwanted foreign matter from entering the mix receptacle chamber 312.

The hollow member 318 allows an operator to readily add mix to the machine without opening the door 314. To supply additional mix to the machine, the operator removes the cap 324 and pours the mix into input end 322 of the tube so that the mix flows into the mix receptacle 312. The mix is then transformed into an extrudable frozen confection, as described above.

Figure 12:
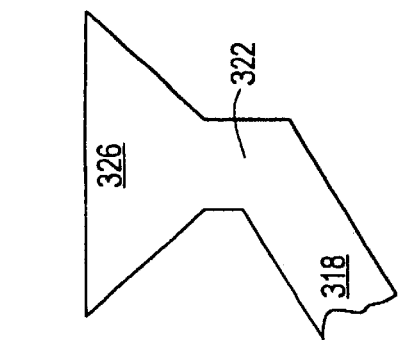
FIG. 12 is a schematic diagram of a funnel mechanism forming a portion of the frozen confection dispensing machine of FIG. 11.

As shown in FIG. 12, a structure or funnel mechanism 326 can be secured to the input end 322 of the hollow member 318. The funnel mechanism 326 is adapted to hold a mix container while the mix flows from the mix container into the hollow member 318. While the funnel mechanism 326 can be formed in a variety of shapes and sizes, it is understood that the configuration of the structure should accommodate mix containers of different shape and rigidity, including bags filled with mix. The funnel mechanism 326 can be rigid, semi-rigid, and flexible. In one embodiment, the funnel mechanism 326 has a rigid frusto-conical shape.

The funnel mechanism 326 allows an operator to place the mix container in the funnel mechanism while the mix empties into the hollow member 318. Thus, the operator need not be present while the mix in the container empties into the machine via the hollow member 318. An operator can thereby fill a number of machines simultaneously.

Figure 13:
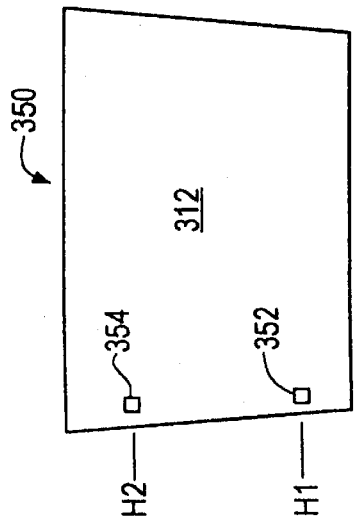
FIG. 13 is a schematic diagram of a sensor system forming a portion of the frozen confection machine of FIG. 11.

FIG. 13 shows a low level sensing system 350 for determining that additional mix should be added to the machine. A first sensor 352 is located in the mix receptacle 312 at a first height H1 and a second sensor 354 is located at a second height H2. The first sensor 352 is activated when the level of mix in the mix receptacle 312 is less than a first predetermined level. Mix should be added to the mix receptacle to prevent exhaustion of the supply of mix. Sufficient mix should be added such that the level of mix in the mix receptacle is greater than the second height H2.

The sensor system 350 can include an indicator 356 (FIG. 11) for alerting an operator that the supply of mix needs to be replenished. The indicator can be formed from a variety of devices that provide a signal perceptible to an operator including visual and audible devices. In one embodiment, the indicator 356 is a yellow flashing light located on the top of the machine. The light 356 illuminates as the level of mix falls below H1 and turns off when the level of mix rises above H2.

Figure 14:
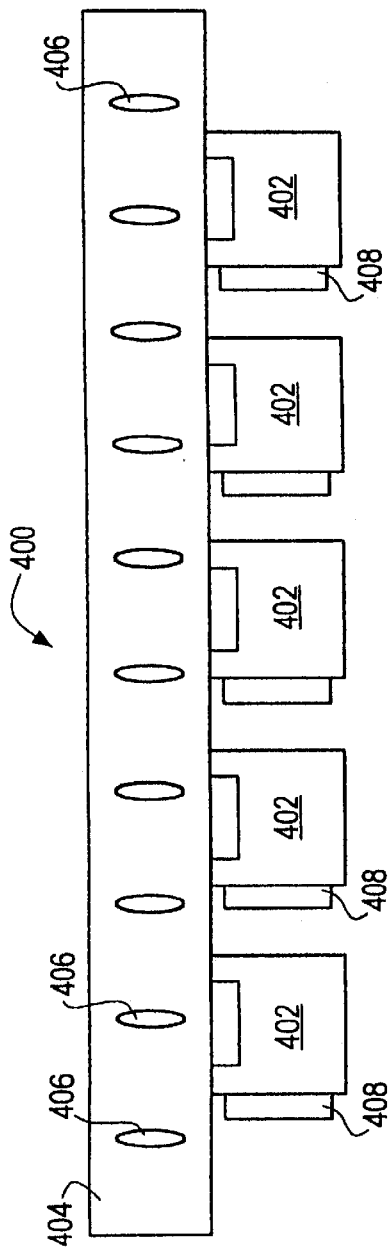
FIG. 14 is a schematic diagram of an assembly line including a plurality of the frozen confection dispensing machines in accordance with the present invention.

FIG. 14 shows an exemplary assembly line 400 including a series of frozen confection dispensing machines 402 located adjacent a conveyor belt 404. The conveyor belt 404 moves a product, i.e., pastry shells 406, alongside the frozen confection machines 402 at a given rate. A respective frozen confection machine 402 detects the product, inserts a nozzle through the shell, and fills the shell with a predetermined volume of the frozen confection.

Alternatively, one or more operators can manually activate a machine to fill a pastry product. The operator fills the pastry with the frozen confection by placing the pastry over the nozzle and actuating the tap assembly such that the proximity switch is activated. The control circuit 212 described above provides a predetermined extrusion cycle time so that the operator does not overstress the machine. This prevents overheating of the machine components and maintains a desired consistency and temperature for the extruded frozen confection.

Each of the machines 402 includes hollow member 408 for providing fluid access to a respective mix receptacle, as described above. To fill a machine having an illuminated low level indicator, an operator retrieves a mix container and places the container in funnel mechanism 326 (FIG. 12) at the inlet end 322 of the hollow member. The hollow member 408 allows an operator to add mix without moving a machine away from the conveyor belt 404. The supply of mix is replenished while the machine continues to extrude frozen confection. Thus, the machines are continuously operational as filling of the machines does not require the machine to cease extrusion so that production proceeds without interruption.

In one embodiment, the machines 402 are cooled with a fluid to prevent overheating of the various machine components, such as the refrigeration compressor. To maintain the consistency of the extruded frozen confection among the plurality of machines, the cooling fluid should enter each machine at about the same temperature. That is, the supply of coolant should not be connected to the machines in a serial configuration since each machine will elevate the coolant temperature. In an exemplary embodiment, each machine is coupled to a common coolant supply. In another embodiment, the machines are placed in climate controlled environment to prevent heat build up in the centrally located machines. Insulation can also be placed between adjacent machines to discourage heat flow from one machine to another.

Figure 15:
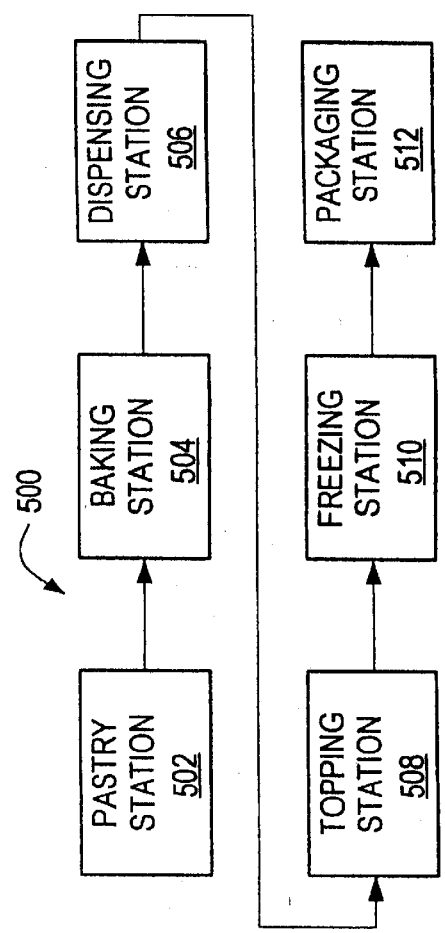
FIG. 15 is schematic diagram of exemplary processing stations for making a frozen product including a filling station utilizing frozen confection dispensing machines in accordance with the present invention.

FIG. 15 shows a facility 500 for assembly line production of a frozen confection product with various processing stations. The facility 500 includes a pastry station 502 where ingredients are mixed and discharged in a desired amount and shape onto a conveyor belt. The raw pastry product enters a baking station 504 where the raw pastry is baked for a predetermined time to form a pastry product, such as an eclair shell. After baking, the pastry product can be cooled if desired prior to further processing. The pastry shells are then passed to a dispensing station 506 where frozen confection dispensing machines fill the pastry shells with a selectable amount of the frozen confection, as described above. The filled eclair can be moved to an optional topping station 508 where chocolate or the like, can be applied to the product. The product is then rapidly frozen in a freezing station 510, such as in a conventional nitrogen tunnel, and boxed and crated in a packaging station 512.

Having described various exemplary embodiments of the invention, it will now become apparent to one of ordinary skill in the art that other embodiments incorporating their concepts may be used. Accordingly, the invention is not to be limited to the particular embodiments described herein, but rather limited only by the spirit and scope of the appended claims. All publications and references cited herein are expressly incorporated herein by reference in their entirety.

What is claimed is:

1. A frozen confection dispensing machine, comprising:
a housing having an exterior with at least one opening therethrough;
an outlet port for dispensing the frozen confection;
an inlet port for receiving a supply of mix, the inlet port having:
a first section disposed on the exterior of the housing: and
a second section contiguous with the first section, the second section protruding through the opening in the housing,
wherein the machine can dispense the frozen confection while mix is being added to the machine.

2. The frozen confection dispensing machine as claimed in claim 1, further comprising:
a user interface unit affixed to the exterior of the housing, the user interface unit being operable to select an amount of frozen confection to be dispensed from the outlet port;
a control circuit coupled to and programmable via the user interface unit, the control circuit controlling the machine to dispense the selected amount of frozen confection.

3. The frozen confection dispensing machine as claimed in claim 3, wherein the outlet port comprises:
a dispenser tap on the exterior of the housing, the dispenser tap dispensing the selected amount of frozen confection therethrough; and
an electronic device electronically coupled to the control circuit, the electronic device causing the dispenser tap to dispense the selected amount of frozen confection in accordance with a signal received from the controller.

4. The frozen confection dispensing machine as claimed in claim 3, wherein the electronically activated device is a solenoid.

5. The frozen confection dispensing machine as claimed in claim 1, wherein the outlet port comprises:
 a dispenser tap on the exterior of the housing, the dispenser tap dispensing the frozen confection therethrough; and
 an electronically activated device operable to cause the dispenser tap to dispose the frozen confection.

6. The frozen confection dispensing machine as claimed in claim 5, wherein the electronically activated device is a solenoid.

7. A frozen confection dispensing machine, comprising:
 a housing defining an inner housing volume and having an exterior with at least one opening therethrough;
 an outlet port for dispensing the frozen confection;
 an inlet port for receiving a supply of mix, the inlet port having:
  a first section disposed on the exterior of the housing;
  a second section contiguous with the first section, the second section protruding through the opening in the housing; and
 a mix receptacle in fluid communication with the second section and being positioned in the interior of the housing, the mix receptacle storing frozen confection mix supplied to the machine,
 wherein the machine can dispense the frozen confection while frozen confection mix is being added to the machine.

8. The frozen confection dispensing machine as claimed in claim 7, further comprising:
 a user interface unit affixed to the exterior of the housing, the user interface unit being operable to select an amount of frozen confection to be dispensed from the outlet port;
 a control circuit coupled to and programmable via the user interface unit, the control circuit controlling the machine to dispense the selected amount of frozen confection.

9. The frozen confection dispensing machine as claimed in claim 8, wherein the outlet port comprises:
 a dispenser tap on the exterior of the housing, the dispenser tap dispensing the selected amount of frozen confection therethrough; and
 an electronic device electronically coupled to the control circuit, the electronic device causing the dispenser tap to dispense the selected amount of frozen confection in accordance with a signal received from the controller.

10. The frozen confection dispensing machine as claimed in claim 8, wherein the electronic device is a solenoid.

11. The frozen confection dispensing machine as claimed in claim 7, wherein the outlet port comprises:
 a dispenser tap on the exterior of the housing, the dispenser tap dispensing the frozen confection therethrough; and
 an electronic device operable to cause the dispenser tap to dispense the frozen confection.

12. The frozen confection dispensing machine as claimed in claim 11, wherein the electronic device is a solenoid.

* * * * *

UNITED STATES PATENT AND TRADEMARK OFFICE
CERTIFICATE OF CORRECTION

PATENT NO. : 6,325,250 B1
DATED : December 4, 2001
INVENTOR(S) : Anthony V. Feola It is certified that error appears in the above-identified patent and that said Letters Patent is hereby corrected as shown below:

<u>Title page,</u>
Item [56], References Cited, add:
-- FOREIGN PATENT DOCUMENTS
EP 0285709    12/1988.................A23G/28
UK 2172541    9/1986...................A23G/28
WO 9007280    7/1990...................A23G/28 --

<u>Column 10,</u>
Line 62, delete "3" and insert -- 2 --

<u>Column 12,</u>
Line 22, delete "8" and insert -- 8 --

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,325,250 B1 Page 1 of 1
DATED : December 4, 2001
INVENTOR(S) : Anthony V. Feola It is certified that error appears in the above-identified patent and that said Letters Patent is hereby corrected as shown below:

Column 12,
Line 22, delete "8" and insert -- 9 --

Signed and Sealed this

Twenty-seventh Day of April, 2004

JON W. DUDAS
*Acting Director of the United States Patent and Trademark Office*